July 29, 1930.  H. N. OTT  1,771,509
OPTICAL PROJECTION APPARATUS
Filed March 21, 1925.  5 Sheets-Sheet 1

Fig. 1.

INVENTOR.
Harvey N. Ott
by Parker & Rockwood
ATTORNEYS.

July 29, 1930.　　　H. N. OTT　　　1,771,509
OPTICAL PROJECTION APPARATUS
Filed March 21, 1925　　5 Sheets-Sheet 2

July 29, 1930.  H. N. OTT  1,771,509
OPTICAL PROJECTION APPARATUS
Filed March 21, 1925   5 Sheets-Sheet 4

INVENTOR.
Harvey N. Ott
by Parker & Prichard
ATTORNEYS.

July 29, 1930.　　　H. N. OTT　　　1,771,509
OPTICAL PROJECTION APPARATUS
Filed March 21, 1925　　　5 Sheets-Sheet 5

INVENTOR.
Harvey N. Ott
by Parker & Brockwow,
ATTORNEYS.

Patented July 29, 1930

1,771,509

UNITED STATES PATENT OFFICE

HARVEY N. OTT, OF BUFFALO, NEW YORK, ASSIGNOR TO SPENCER LENS COMPANY, OF BUFFALO, NEW YORK

OPTICAL PROJECTION APPARATUS

Application filed March 21, 1925. Serial No. 17,393.

This invention relates to optical projection apparatus of the kind adapted particularly for projecting still pictures.

The objects of this invention are to provide an apparatus of this kind which operates in connection with a film, strips or bands of material carrying the subjects to be projected, and which is provided with mechanism for advancing the subject carrier either automatically or at will; also to provide a mechanism of improved construction for advancing the subject carrier; also to provide an improved arrangement of the light house within the case of the apparatus; also to provide an improved arrangement of the light house with reference to the subject carrier, whereby the usual twisting of the subject carrier is avoided; also to provide an apparatus of this kind with an improved housing for a subject carrier, and also to improve the construction of apparatus of this kind in the other respects hereinafter specified.

In the accompanying drawings:—

In the specification and claims, the term "subject carrier" is used to designate that element from which the image is projected on the screen and is intended to cover opaque objects and stencils as well as the usual film or lantern slide plates.

In the particular embodiment of the invention shown in the accompanying drawings, A represents a case or housing in which the projection apparatus is contained, and this case or housing may be of any suitable or desired construction and is provided on its base with feet $a$ on which the housing is adapted to stand. The housing is provided at opposite sides with doors or openings $a'$ and $a^2$, and its front wall is provided with an opening $a^3$ through which light passes from the apparatus to the screen, this opening being adapted to be closed by a slide $a^4$ of any suitable construction. The door $a'$ is adapted to afford access to a lighthouse B arranged in a compartment C within the housing A, and also to a compartment D in which wires or other parts of the apparatus may be confined when not in use. The other door $a^2$ affords access to a subject carrier housing E, which is removably supported within a compartment $e$ of the housing A, and which is adapted to contain the film or other subject carrier which is to be shown. The door $a^2$ also affords access to the projecting lenses and the actuating mechanism for placing the subject carrier into operative relation to the lenses.

The lighthouse B contains the usual electric lamp or other source of light F, which may be arranged in a socket member 20 suitably secured in a holder 21, having a base 22 which is slidable lengthwise on a sub-base 24, the base 22 having at the inner side thereof a lug or projecting portion 25 engaging the inner edge and a part of the lower face of the sub-base 24, and at the other side of the base 22, a bolt 27 engages a threaded part 28 secured on the base 22 and extends through a slot 29 arranged lengthwise near the outer portion of the sub-base 24, and a clamping member 30 arranged below the sub-base 24 and adapted to be pressed against the lower face of the sub-base is also provided with a corresponding slot through which the bolt 27 extends. The lower end of the bolt is provided with a knurled head 31 by means of which the bolt may be tightened. Consequently, the base 22 is slidable lengthwise of the sub-base 24 because of the engagement of the bolt in the slots of the sub-base and clamping member 30, and the engagement of the lugs 25 with the inner edge of the sub-base 24. The sub-base 24 in turn rests at its opposite sides on brackets or projections 33, and is slidable crosswise or transversely of the apparatus thereon. Consequently, since the base 22 is slidable lengthwise of the apparatus and the sub-base is adjustable transversely thereof, it will be obvious that the lamp may be adjusted horizontally in any direction when the clamping screw 27 is loosened, and the vertical adjustment may be effected by moving the socket member 20 up or down when a clamping screw 34 of the holder 21 is loosened. Upon tightening the screw or bolt 27, the clamping member 30 is drawn upwardly into engagement with the lower face of the ledges 33 so as to lock the sub-base 24 against lateral movement and also to lock the base 22 to the sub-base 24 to hold the base 22 against longitudinal movement, whereby the lamp may be adjusted as desired and rigidly secured in any desired position. Other means for adjusting the lamp may of course, be provided.

The brackets 33 are preferably secured to the sides of the lamp housing B, and a door 35 arranged on the side of the lamp housing adjacent to the door $a'$, affords access to the lamp and the adjusting mechanism therefor, the door closing only the upper part of the lighthouse in which heat is generated by the lamp or source of light F. The opposite side of the lamp housing B is provided with an outlet for the light including a condensing lens 36. The upper part of the lighthouse B extends through an opening 37 in the upper wall of the casing A and is provided with the usual baffles or deflectors 38 which permit the escape of the heated air through the top of the lighthouse without permitting the passage of light. In order to provide for a circulation of air, the portion of the housing A below the lighthouse is provided with holes or openings 39 to permit cool air to enter into the light house, and a slot or space 40 is preferably also formed for the same purpose between the casing A and the door $a'$.

Figure 2:
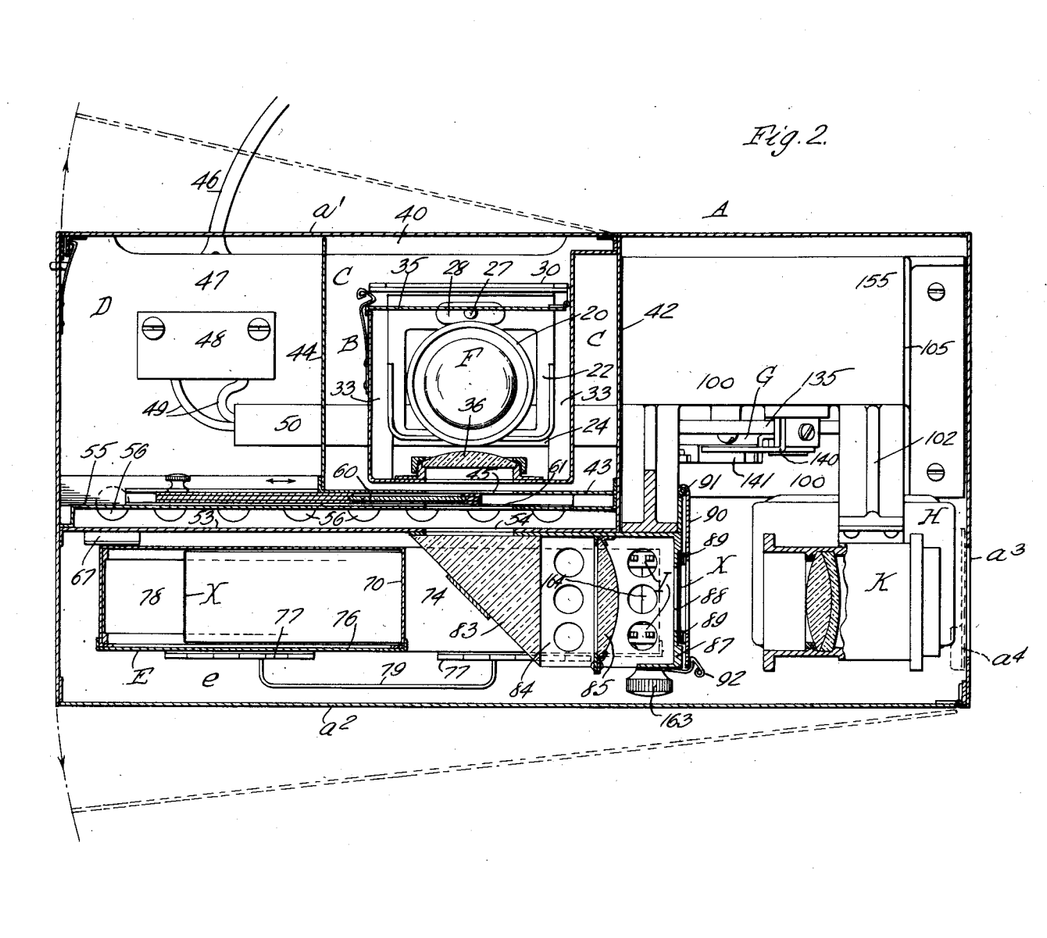
Fig. 2 is a sectional plan view thereof on line 2—2, Fig. 1.
Figure 3:
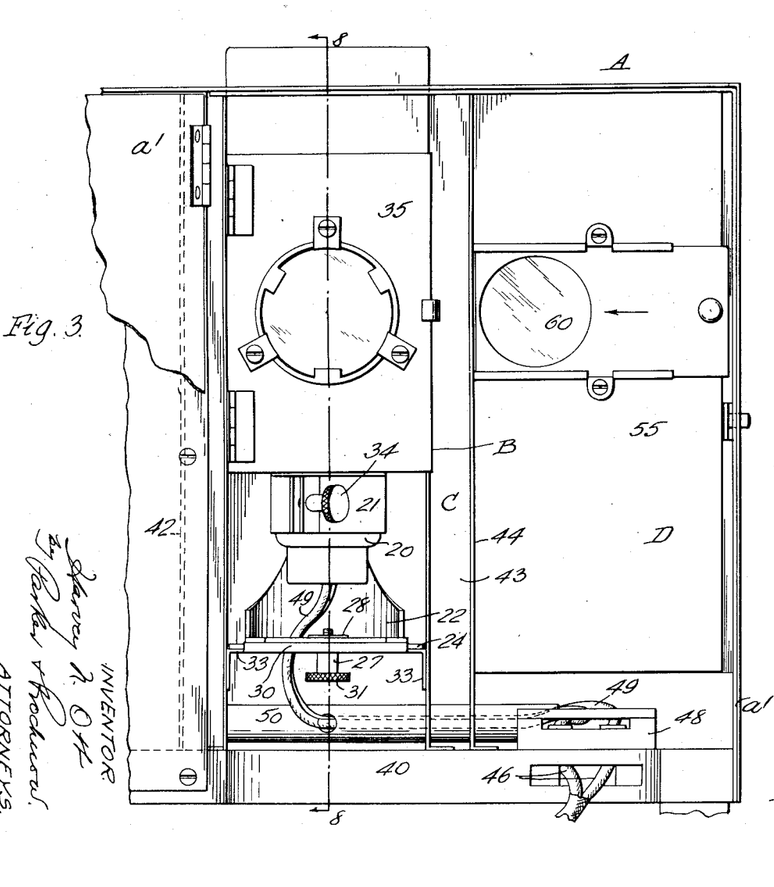
Fig. 3 is a fragmentary side elevation thereof, showing the door for attaining access to the light house, opened.
Figure 4:
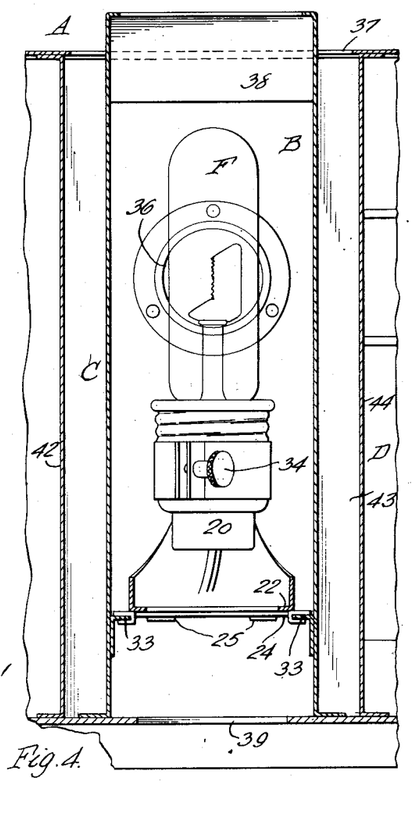
Fig. 4 is a fragmentary transverse sectional elevation thereof on line 4—4, Fig. 8.

In order to make it possible to have the lighthouse arranged within the casing A of the projection apparatus without having the heat from the lighthouse damage other portions of the projecting apparatus, the lighthouse is contained in the compartment or chamber C formed in the cabinet A and including walls 42, 43 and 44, see particularly Fig. 2, this compartment being open at the side thereof facing the door $a'$. The wall 43 of the compartment C is provided with an aperture 45 through which light may pass from the condenser lens 36. The lighthouse is so positioned in the compartment C that an air space is formed between the walls of the lighthouse and the walls of the compartment, and the opening 37 in the upper wall of the housing A is made large enough so that a free discharge of the hot air from the spaces between the lighthouse and the wall of the compartment C is permitted. By means of this construction, ample provision is made for dissipating the heat generated in the lighthouse without transmitting the heat to other parts of the casing A of the apparatus or to other parts of the apparatus, since the lighthouse as shown is connected with other parts of the apparatus only at the base of the lighthouse. Since the lower front portion of the lighthouse B is open, cool air passing through the slot or opening 40 formed between the bottom wall of the housing A and the door $a'$ may pass upwardly either through the lighthouse or through the space surrounding the lighthouse and the slot 40 also extends to the compartment D so that the wires or conductors 46 which are adapted to be connected with any suitable source of electric power may extend through this slot into the compartment D when the wires are not in use. These wires or conductors extend under the floor or bottom wall of the compartment D and are connected with a suitable junction or terminal 48 from which other wires or conductors 49 pass through a conduit 50 to a controlling switch G and a motor H of any suitable kind for actuating the movable parts of the apparatus, and also to the lamp F. By means of the construction described, the light house is secured only to the bottom wall of the housing of the apparatus and all portions of the light house above the bottom thereof are spaced from other parts of the projecting apparatus.

53 represents a partition wall which separates the compartments C and D from the compartment $e$, this partition wall having an aperture 54 arranged in alinement with the aperture 45 and the condenser lens 36 to permit the passage of light therethrough. Another partition wall 55 is secured to the partition wall 53 to form an additional air space between the lighthouse B and the compartment $e$ which contains the removable subject carrier housing E, and a series of apertures 56 arranged in the bottom wall of the housing A, and a corresponding series of apertures 57 arranged in the top wall of this housing, admit air to the lower and upper portions respectively of the air space formed between the partition walls 53 and 55 so that ample ventilation and carrying away of heat is provided in this space. The partition wall 55 may also, if desired, be employed for the purpose of carrying a screen of any suitable kind, such for example as a color screen 60, and which may be moved into and out of alinement with the path of light through the condenser lens 36 and an aperture 61 formed in the partition wall 55 and the other apertures in alinement therewith through which light passes from the condenser lens 36. The screen 60 in the construction shown is arranged on a slide for releasably securing the same in any desired position. In the construction shown in Fig. 2, the screen 60 is shown as arranged in a half way position and it will be obvious that if the slide is moved to the right in this figure, the screen will be placed into registration with the light openings in the partition walls, and if the slide is moved to the left, the screen will be moved out of registration with the lens. Any other means for removably placing a screen in the path of light may be provided if desired, and other arrangement of the partition walls may also be provided. It will be obvious from the description of the partition walls of the housing A that two independent air spaces are provided between the lighthouse B and the compartment e in which the removable subject carrier housing E is located, and that ample provision is made for ventilation of these two air spaces so that there is no danger that the heat from the lighthouse will injure or destroy any film or other subject carrier contained in the housing E. Furthermore, this housing, as is clearly seen in Fig. 2, is spaced from the partition wall 53, when in its operative position, by means of stop projections 67 and 68, Figs. 1 and 2, thereby providing an additional protection for the film or other subject carrier.

The subject carrier housing E in which the film or other subject carrier is contained and from which it is fed to the projecting mechanism, which in turn feeds the portion of the subject carrier which has been projected back into the housing E, is shown in the accompanying drawings as being removable from the housing A, which is desirable for the reason that it facilitates the handling of the subject carrier. It will be understood, however, that it is not essential to the successful operation of other parts of the projecting apparatus to have the subject carrier housing removable, and consequently, if desired, this housing may be fixed within the main housing A of the apparatus. This subject carrier housing, as shown in the drawings, is substantially of L-shape, and is of a width sufficient to contain the subject carrier. The housing E has an upwardly extending part 70 provided near its upper portion with a slot 71 through which the subject carrier may pass to the projecting devices. The subject carrier normally lies in folds on the bottom of the housing E, and when it is desired to feed the same to the projecting devices, the subject carrier is guided over a guide post 72 extending laterally from the side wall of the housing E and approximately on a level with the slot 71, so that the subject carrier passes from the bottom of the housing E over the guide post or projection 72, and then out through the slot 71. The lower extension or leg 74 of the housing is provided with a receiving slot or opening 75 through which the subject carrier is returned to the housing E. The side of the housing E which is adjacent to the door $a^2$ of the main housing of the projecting apparatus is provided with a door or opening 76, this door being hinged at 77 to the lower portion of the side wall of the housing E, in such a manner that the upper leg or extension 70 of the housing as well as the upper portion of the lateral leg or extension 74 are rendered accessible by the opening of the door 76. 78 represents a curved guide for the subject carrier, which is arranged within the housing E to prevent damage to the subject carrier by crowding the same into the corner of the housing E and 79 is a handle secured to the housing to facilitate the removal and the placing of the same into the main housing A of the apparatus. The subject carrier housing E is particularly designed for use in connection with a strip of film, which may be endless, if desired, or other subject carrier which may be loosely folded within the housing E, since the subject carrier uesd in connection with projection of still pictures is usually not of very great length. If, however, it should be found desirable to wind the subject carrier on reels as is done in connection with motion picture machines, it will be obvious that means can be readily supplied for supporting reels for subject carriers in the housing E.

The light, after passing through the aperture 54 in the partition wall 53, strikes a reflecting surface which changes the direction of the light from a direction transversely of the apparatus to one lengthwise thereof. Any suitable reflecting means may be employed for this purpose, a prism 83 being shown in the construction illustrated, which has its diagonal face silvered, and which is suitably mounted in a supporting frame 84 secured on the partition wall 53, and if desired, this frame may also support a lens 85. The front end of this frame supports guide means for the subject carrier, which include the front face 87 of the frame 84, which is provided with a window or aperture 88 in front of which the film or other subject carrier to be projected is positioned during the projection thereof, and the subject carrier is held flatly against the front wall or face 87 of the frame 84 by means of springs 89 adapted to engage the sides of the subject carrier to hold the same flatly across the window 88, the springs being mounted as is customary on a door or hinged part 90, hinged at 91 on a part of the frame 84 and adapted to be held closed by a catch or latch 92. The door is adapted to swing into its open position upon the release of the latch 92 so as to permit the threading of the film or subject carrier.

The reflector 83 and frame 84 are arranged at one side of the upwardly extending portion 70 of the subject carrier housing E and above the lower projection 74 thereof. The subject carrier X, after leaving the housing E through the slot 71, passes over a roller or guide 93, which is substantially in horizontal alinement with the slot 71, and from this guide roller the subject carrier passes downwardly in front of the frame 84 and is engaged by a feed sprocket I for imparting the desired movement to the subject carrier C, and this feed sprocket I passes the subject carrier after the same has been projected, through the slot 75 into the lateral extension 74 of the subject carrier housing E. In order to hold the subject carrier X in operative engagement with the sprocket I, the door 90 in the construction shown is provided with a downwardly extending portion 94 which is provided with slots 95 through which the teeth of the sprocket I may extend, the parts of the downwardly projecting portion 94 at the sides of the slot 95 engaging the subject carrier to hold the same in engagement with the sprocket wheels I. By means of this arrangement it will be seen that the film or other subject carrier is taken from the housing E therefor and passed into position to be projected and back again into the housing without twisting the film in any way, since the light, after being reflected by the prism 83, passes lengthwise of the apparatus substantially in the same vertical plane as the subject carrier housing. Other means for guiding the film and for projecting the same may, of course, be provided if desired.

In order to prevent any heat which may be developed or dissipated from the reflector 83 or lens 85 from damaging the subject carrier X which passes over the parts, one or more shields or guards 97, 98 may be provided. The guards 97 and 98 are arranged below the path of the subject carrier X to the guide roller 93 and are inclined upwardly toward the partition wall 53, and openings 99 are preferably provided in the partition wall 53 just below the connection therewith of the guards 97, 98, so that the heated air rising from the reflector 83 and lens 85 will pass upwardly along the lower faces of the guards 97, 98, and through the openings 99 into the air space between the partition walls 53 and 55. Ample provision is made for circulation of air around the projecting devices, by means of openings or apertures in the bottom of the casing A. Other means for protecting the subject carrier from damage by heat dissipated from the reflector and lens may be provided.

The frame 84 in which the reflector and lens 85 are mounted, the guide roller 93 and the sprocket I may be mounted on a frame or support 100 which is preferably of rigid construction and which is secured to the lower wall of the housing A in any suitable or desired manner. The frame or support 100 has a bracket 101 on which the motor H is mounted, and the controlling switch G is also secured on an upright wall of the frame or support 100. This frame is also provided with an arm 102 on which the objective lenses in their housing or mounting K are secured, the housing K, of course, being in alinement with the optical axis of the lens 85, and light, after passing through the objective lenses passes out of the casing A through the aperture $a^3$ therein. The frame or base 100 preferably also has formed integrally therewith a gear box 105 in which is arranged the gearing which is interposed between the motor H and the sprocket I.

Figures 5, 6, 7:
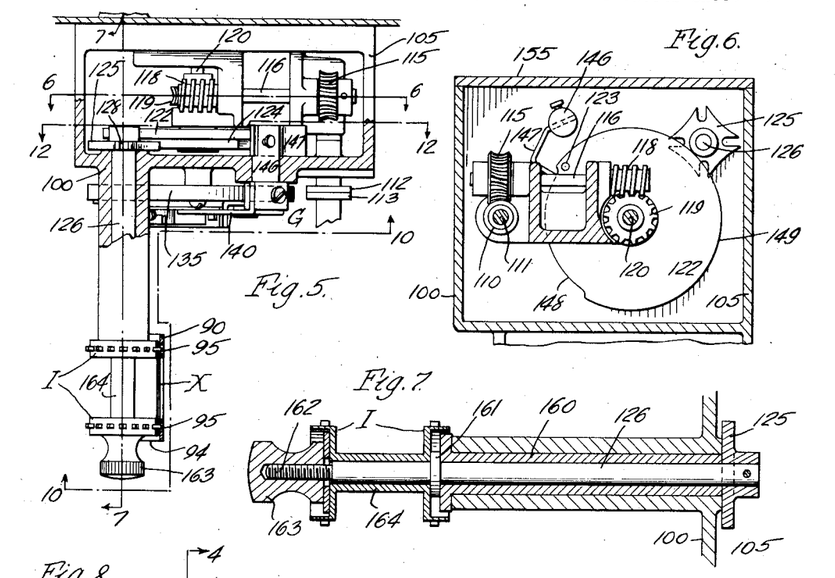
Fig. 5 is a fragmentary sectional plan view thereof, showing the subject carrier advancing mechanism.
Fig. 6 is a vertical sectional elevation thereof, on line 6—6, Fig. 5.
Fig. 7 is a sectional elevation of the feed sprocket, sprocket shaft and bearing for the subject carrier, on line 7—7, Fig. 5, on an enlarged scale.
Figures 8, 9:
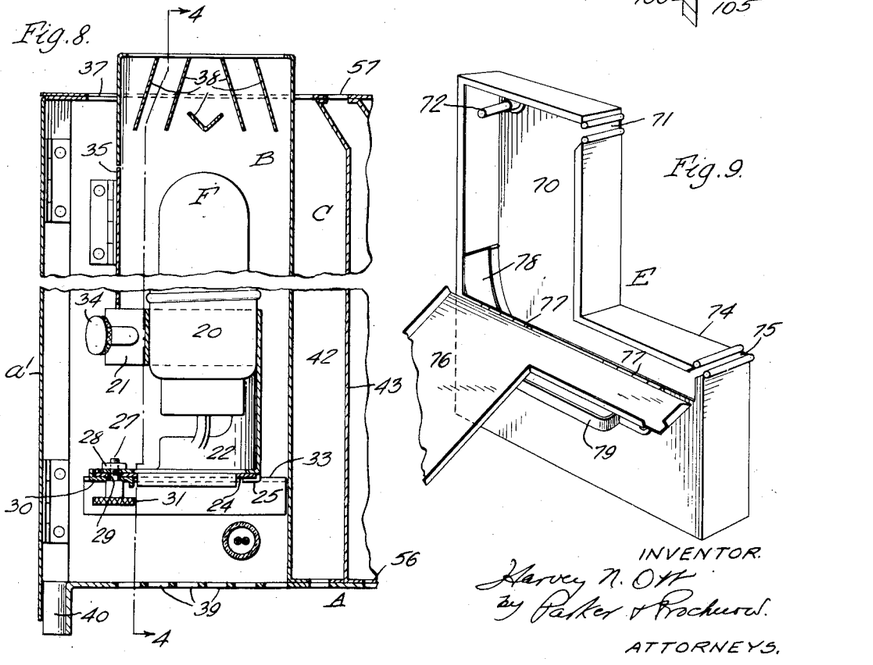
Fig. 8 is a transverse vertical section of the light housing and the light adjusting means therein, on line 8—8, Fig. 3.
Fig. 9 is a perspective view of the removable subject carrier housing or container.
Figure 12:
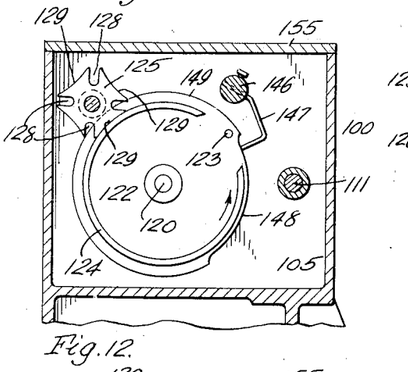
Figs. 12, 13 and 14 are sectional elevations on line 12—12, Fig. 5, showing the intermittent mechanism for controlling the motor controlling switch.
Figure 13:
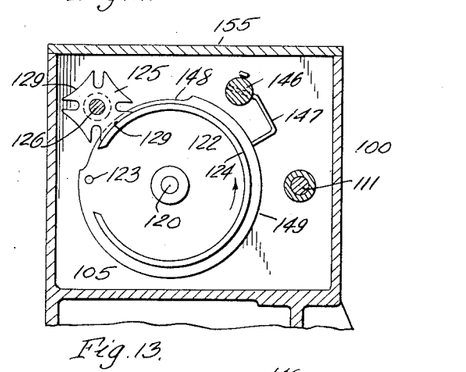
Figure 14:
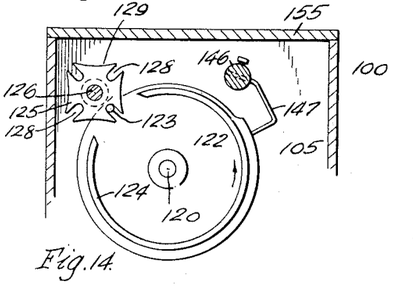

The gear mechanism for intermittently rotating the sprocket wheels I from the motor H may be of any suitable or desired construction, that shown including a worm 110 arranged within the gear box and secured on a shaft 111 which extends through a side wall of the gear box 105 and is provided on its outer end with any suitable coupling device adapted to be coupled with the motor shaft, a flange 112 being shown in Fig. 5, which is connected to a corresponding flange 113 mounted on the shaft of the motor. The worm 110 drives a worm gear 115 mounted on a shaft 116 extending lengthwise of the machine and on the other end of this shaft a worm 118 is mounted, which is adapted to mesh with a worm gear 119 secured on a shaft 120, and a cam disk 122 is also mounted on the shaft 120. The cam disk 122, as is best seen in Figs. 12, 13 and 14, is provided with a pin 123 and a laterally extending flange 124, the pin and flange being adapted to cooperate with a star wheel 125 mounted on a shaft 126 on which the sprockets I are also secured. The star wheel 125 is provided with the usual radial slots 128 in which the pin 123 is adapted to engage and also with concavely curved faces 129 which are adapted to engage the laterally extending flange 124 to hold the star wheel from turning when not engaged by the pin 123. As will be readily understood by referring to Figs. 12 to 14, each complete revolution of the cam disk 122 produces a quarter revolution of the star wheel 125, and consequently a quarter revolution of the sprocket wheels I. Consequently, when the motor is operating continuously, the picture will be changed each time that the star wheel 125 is given a quarter of a revolution, and the time interval during which a picture is shown on the screen may be varied by varying the speed of rotation of the motor, this being accomplished by any usual form of rheostat 130, Fig. 1, which may be adjusted by means of a handle or knob 131 arranged on the top of the casing A.

When the motor is operating continuously, each picture will be shown for the same length of time unless the rheostat is varied, and this variation will only result in a comparatively small change in the time interval. Consequently, means are provided whereby the motor will automatically stop after each change of picture and whereby the motor may again be started by hand, so that the pictures may be shown for any desired time interval, as may be desirable when the machine is used in connection with an illustrated lecture or talk. The starting of the motor may in this case be effected by the lecturer or speaker by closing a switch for a short interval of time, which switch may be connected by flexible conductors leading from the projection apparatus to the speaker so that the speaker may stand near the screen while operating the apparatus.

The mechanism for stopping the operation of the motor is preferably so constructed that the motor will be stopped just before the mechanism is ready to change the picture by rotating the sprockets I through a quarter of a revolution, so that when the operator or lecturer actuates a switch or other means for again starting the operation of the motor, the picture will be changed without any objectionable loss of time.

Any suitable mechanism may be employed for stopping the operation of the motor after the same has moved the gearing into a position in which a change of the picture is about to be effected. In the construction shown for this purpose a motor controlling switch mechanism G is provided including an insulating panel 135 having a pair of terminals 136, 137 mounted thereon and a spring or switch member 138 is mounted on the terminal 136 and extends into proximity to the terminal 137 and is held out of contact therewith by its own resilience. 140 represents an oscillatory arm provided at its outer end with a block or part 141 adapted to engage the contact spring or switch member 138 and to move the same into engagement with the contact 137. A spring 142 normally holds the oscillatory arm 140 out of contact with the contact member 138 and in engagement with the stop post or part 143. The contacts 136 and 137 are arranged in the main circuit leading to the motor H, so that when the parts are in the position shown in Figs. 1 and 10 the circuit to the motor H is open, so that no current is supplied to the motor. When, on the other hand, the parts are in the position shown in Figs. 11 and 15, the contacts 136, 137 are connected by means of the switch member 138 so that the circuit to the motor is completed, thus causing the motor to operate.

Figure 1:
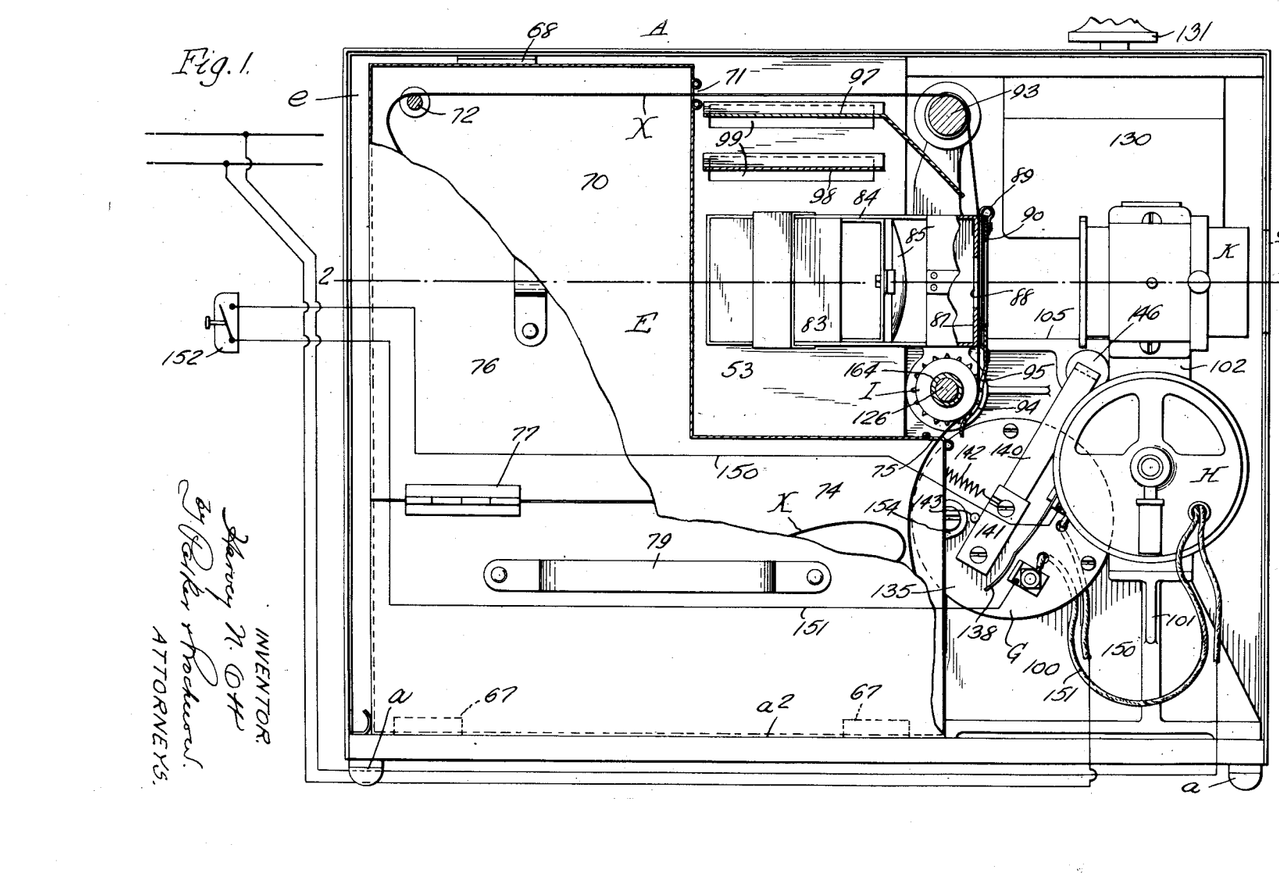
Fig. 1 is a longitudinal sectional elevation of an optical projection apparatus embodying the invention.
Figure 10:
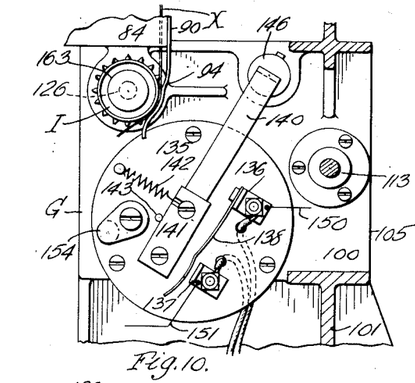
Figs. 10 and 11 are sectional elevations on line 10—10, Fig. 5, of the motor controlling switch for the subject carrier advancing mechanism showing the same in open and closed positions respectively.
Figure 11:
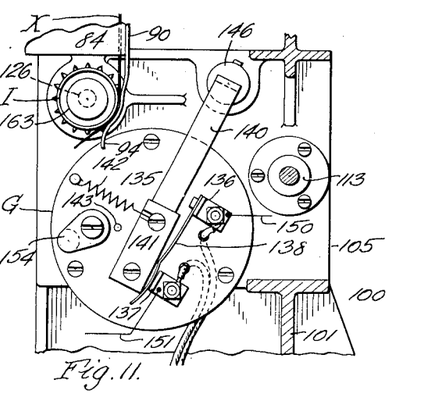

The oscillatory arm 140 is rigidly secured to a pin or pivot 146 journalled in a wall of the gear case 105 and extending through the wall to the interior of the gear case. The inner portion of the pivot or pin 146 is provided with an arm 147 which is adapted to contact with the outer face or periphery of the cam plate 122. The periphery of the cam plate 122 is provided with a recessed or depressed portion 148 and with a higher face 149, and the arm 147 is yieldingly pressed by the spring 142 into engagement with these cam faces. It will be seen by referring to the drawings that the parts are so organized that when the arm 147 is in engagement with the raised portion 149 of the cam, the switch controlling arm 140 is moved into the position shown in Fig. 11, in which position the circuit closing or switch member 138 is in engagement with the terminal 137, thus closing the circuit to the motor H. When the arm 147 is in engagement with the depressed portion 148 of the cam, the spring 142 draws the switch controlling arm 140 out of engagement with the switch member 138 and permits the same to break the circuit to the motor as shown in Figs. 1 and 10, thus causing the motor to stop. The depressed portion of the cam 148 may be located in any desired position on the periphery of the cam, but preferably this portion of the cam is so positioned with reference to the pin 123 that the motor will be stopped when the parts are in the position in which the pin 123 is about to turn the star wheel 125, as shown at Fig. 12.

Figure 15:
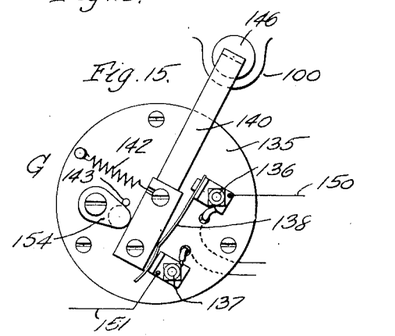
Fig. 15 is an elevation of the motor controlling switch showing the same in closed position, detached from the subject carrier advancing mechanism.

In order to make it possible to start the operation of the motor H when the parts of the motor controlling mechanism are in the position shown in Figs. 10 and 12, a pair of conductors 150, 151 are provided, each of which connects with one of the terminals 136, 137, and the ends of these conductors may be connected by means of any suitable circuit closing device, such as a switch or push button 152, Fig. 1. The conductors 150, 151, may be of any desired lengths so that the person delivering the lecture or talk may have the switch or push button in his hand while standing near the screen. Consequently, when the lecturer wishes to have the picture change, it is only necessary for him to close the switch 152 and thus bridge the gap between the contacts 136, 137, and permit current to flow to the motor H, the lecturer or operator holding the switch closed until the picture has been changed, whereupon he may release the button or switch 152, but since the arm 147 will then be in engagement with the elevated or raised portion 148 of the cam 122, the circuit to the motor will be completed and the motor will continue to operate after the picture has been changed to bring the parts of the apparatus into the position approximately as shown in Fig. 12, so that a comparatively short time interval will elapse between the closing of the circuit by the lecturer and the changing of the picture. By means of this construction a person may deliver an illustrated lecture without the necessity of having an attendant to operate the projection apparatus. When it is desired to use the apparatus to show a series of pictures with a definite time interval between each picture, the switch closing arm 140 may be moved into its circuit closing position as shown in Fig. 15, by means of a cam 154 which is pivoted on the panel 135 and which is adapted to engage the insulated block 141 on the end of the arm 140 and to hold the same in a position to close the circuit between the contacts 136, 137, until released by hand. When the contact arm 140 is in this position, the arm 147 will be held against moving downwardly into the depressed portion 148 of the cam so that the machine will automatically change pictures after a definite time interval, and this time interval can be controlled within certain limits by means of a rheostat or speed controller 130 for the motor H which can be actuated by adjusting the controller knob 131 on the top of the casing A of the apparatus.

The gear box 105 may be filled with oil or other lubricant and the upper face thereof may be closed by means of a cover 155, so that the gearing connecting the motor with the sprockets I will be thoroughly lubricated.

Means are preferably provided for permitting the sprockets I to be readily adjusted relatively to the driving shaft therefor so that the film or subject carrier may be properly positioned or framed with reference to the path of light. In the construction shown for this purpose, see Fig. 7, a friction connection is provided between the shaft and the sprockets, the shaft 126 being journalled in the bearing bushing 160 and being provided at the outer end of the bushing with a washer or collar 161 rigidly secured on the shaft 126. The outer end of the shaft is provided with a screw threaded portion 162 with which a nut 163 is adapted to engage. The sprocket wheels I are preferably formed integral with or secured on a sleeve 164 which is journalled on the shaft 126, and consequently, when the nut 163 is tightened, the sprockets I and their connecting sleeve 164 will be pressed against the washer 161 on the shaft 126 and held to turn therewith. When the nut 163 is loosened, the sprockets I may be readily turned relatively to the shaft 126 for adjustnig the subject carrier.

The apparatus described has the advantages that all of the parts of the machine including the source of light are conveniently arranged in a compact housing, which renders the machine readily portable, and that this arrangement is such as not to necessitate a twisting of the film. Also the apparatus can be used either to project a series of pictures at a definite time interval between each change of pictures, or the machine may be controlled manually at a distance therefrom so that each picture may be shown for any desired length of time. Furthermore, by the construction described, the subject carrier can easily be removed from the apparatus, and is so arranged that all of the subject carrier except the portions thereof which are being projected and the portions in immediate proximity thereto are arranged below the projecting devices, where they are not exposed to heat dissipated therefrom. The removable subject carrier housing further protects the subject carrier against damage due to any cause.

I claim as my invention:—

1. In a projection apparatus, the combination of a mechanism for intermittently displaying different pictures, electric means for actuating said mechanism, means for interrupting the supply of electric current to said electric means when said mechanism is displaying a picture to interrupt further action of said mechanism, and means operable at will to supply electric current momentarily and separately from the interrupting means to said electric means to cause said mechanism to start an operation to display another picture.

2. In a projection apparatus, the combination of a mechanism for intermittently displaying different pictures from a subject carrier, electric means for actuating said mechanism, means operated by said mechanism for preventing interruption of said electric means until a picture has been placed in display position and then interrupting the supply of electric current to said electric means, and means operable at will to supply electric current to said electric means to start the operation of said mechanism.

3. In a projection apparatus, the combination of a mechanism adapted to intermittently display a different picture during each cycle of operation thereof, electric means for driving said mechanism, current supply circuit means operating said electric means, means operable by said mechanism for maintaining said circuit means effective during a cycle of operation in which a new picture is placed in display position and then rendering the circuit means ineffective, to hold the picture in that position, and additional means operable at will for rendering said circuit means effective to start another cycle of operation and effect a change of pictures.

4. In a projection apparatus, the combination of mechanism including a rotary member for intermittently displaying different pictures from a subject carrier successively, a motor for operating said mechanism to carry said pictures successively into display positions, means on said rotary member for interrupting the operation of said mechanism after said subject carrier has been placed into a position to display a picture, and means operable at will to again start the operation of said motor to cause said mechanism to display a different picture.

5. In a projection apparatus adapted to operate on subject carriers in strip form and provided with successively arranged subjects to be projected, the combination of a rotary member adapted to intermittently advance the subject carrier an amount at each increment of movement sufficient to carry a new subject into display positions, a motor for driving said rotary member, means on said rotary member for stopping the operation of said motor after each increment of advance of the subject carrier, means operable at will to again start the operation of said motor to cause another picture to be displayed, and means operable at will to render the motor stopping mechanism inoperative, whereby said mechanism may operate continuously to display different pictures after definite intervals of time.

6. In a projection apparatus, the combination of mechanism adapted to intermittently advance a subject carrier to successively display different pictures and having switch operating means, an electric motor for operating said mechanism, a switch operated by said means which is actuated to interrupt the supply of electric current to said motor after each advance of a subject carrier, means operable at will for supplying current momentarily to said subject carrier to start said motor to cause another picture to be displayed, and means operable at will for maintaining said switch in a closed position to cause said mechanism to operate continuously.

7. In a projection apparatus, the combination of mechanism adapted to intermittently advance a subject carrier to successively display different pictures, an electric motor for operating said mechanism, a switch for controlling the supply of electric current to said motor, a cam driven by said mechanism and adapted to close said switch to supply current to said motor while said mechanism is advancing a subject carrier to change a picture and to open said switch to interrupt the supply of current to said motor after the picture has been changed, and means operable at will to supply electric current momentarily to said motor for starting the operation of said mechanism to display another picture.

8. In a projection apparatus, the combination of mechanism adapted to intermittently advance a subject carrier to successively display different pictures, an electric motor for operating said mechanism, a switch for controlling the supply of electric current to said motor, a cam driven by said mechanism and adapted to close said switch to supply current to said motor while said mechanism is advancing a subject carrier to change a picture, supply of current to said motor after the picture has been changed, means operable at will to supply electric current momentarily to said motor for starting the operation of said mechanism to display another picture, and means operable at will to render said cam inoperative on said switch, whereby said mechanism operates automatically to advance the subject carrier for changing pictures.

9. In a projection apparatus, the combination of projecting devices, a source of light arranged at one side of said projecting devices, a reflector for reflecting light from said light source to said projecting devices, a subject carrier in strip form which extends above said reflector and downwardly in front of said reflector into operative relation to said projecting devices, and means interposed between said reflector and the portion of said subject carrier which is above it to prevent heat from said light source from damaging that portion of said subject carrier.

10. In a projection apparatus, the combination of projecting devices, a source of light arranged at one side of said projecting devices, a reflector for reflecting light from said light source to said projecting devices, a subject carrier in strip form which extends above said reflector and downwardly in front of said reflector into operative relation to said projecting devices, and ventilating means including a deflecting device interposed between said reflector and the section of the said subject carrier which extends above it at any time for preventing heat from said reflector from damaging said subject carrier.

11. In a projection apparatus, the combination of a housing therefor, a partition wall extending lengthwise of said housing to form a compartment for a subject carrier and a compartment for a source of light, a subject carrier housing removably mounted in said subject carrier compartment, and apertured to permit of the entrance and exit of the carrier, and a projection device in the carrier compartment, supplied with light from the other compartment, and disposed in a position for cooperation with the subject carrier without twisting of the carrier.

12. In a projection apparatus, the combination of a housing therefor, a partition wall extending lengthwise of said housing to form a compartment for a subject carrier and a compartment for a source of light, openings in said longitudinal partition wall through which light may pass laterally of said housing, and means in said subject carrier compartment for reflecting the light to direct the same lengthwise of said housing.

13. In a projection apparatus, the combination of a housing therefor, a partition wall extending lengthwise of said housing to form a compartment for a subject carrier and a compartment for a source of light, openings in said light source compartment for ventilating the same to remove heat dissipated by said source of light, and an air space in said longitudinal partition provided with openings to permit circulation of air in said air space, openings in said longitudinal partition wall to permit light to pass laterally into said subject carrier compartment, means for reflecting the light to cause the same to pass longitudinally out of said subject carrier compartment, and deflectors arranged above said reflecting means and adapted to deflect air heated by the dissipation of heat from said reflector to pass into the air space of said longitudinal partition.

14. In a projecting apparatus, the combination of a main housing having a part which is adapted to be opened for obtaining access to said housing, a removable subject carrier housing adapted to pass through the opening in said main housing and which is adapted to contain a subject carrier in strip form, projecting devices in said main housing, and openings in said removable housing in operative relation to said projecting devices through which the portion of the subject carrier which is being projected and portions in immediate proximity thereto extend.

15. In a projecting apparatus, the combination of a main housing having a part which is adapted to be opened for obtaining access to said housing, a removable subject carried housing adapted to pass through the opening in said main housing and which is adapted to contain a subject carrier in strip form, said removable housing having an upwardly extending portion and a laterally extending portion, projecting devices arranged in said main housing and extending into the space between said upwardly and laterally projecting parts of said removable housing, and openings in said upwardly and laterally projecting parts through which the subject carrier may pass to and from said projecting devices.

16. In a projecting apparatus, the combination of a main housing having an opening, a removable housing adapted to pass through said opening and adapted to contain a subject carrier, projecting devices in said main housing, said removable housing having a part extending upwardly to one side of said projecting devices, and a lateral extension projecting beneath said projecting devices, said extensions being provided with openings through which the subject carrier may pass to and from said projecting devices.

17. In a projecting apparatus, the combination of a main housing having an opening, a removable housing adapted to pass through said opening and adapted to contain a subject carrier, projecting devices in said main housing, said removable housing having a part extending upwardly to one side of said projecting devices, and a lateral extension projecting beneath said projecting devices, said extensions being provided with openings through which the subject carrier may pass to and from said projecting devices, and an opening in said removable housing which affords access to said upwardly and laterally extending portions thereof.

18. In a projection apparatus, the combination of a main housing, projecting devices arranged in said main housing, an opening in one side of said main housing, a removable subject carrier housing adapted to pass through said opening and having an upwardly extending part adapted to extend to the rear side of said projecting devices, and a laterally extending part adapted to project below said projecting devices, said upwardly extending part being provided with an opening, means for guiding said subject carrier through said opening to the projecting devices, and an opening in said laterally projecting part into which the subject carrier is passed after the same has been projected.

19. In a projection apparatus, the combination of a housing, a longitudinally extending partition arranged in said housing and forming a compartment adapted to contain a source of light and a compartment for the subject carrier, projecting devices in the subject carrier compartment, including means for reflecting laterally projected light entering said subject carrier compartment into a direction longitudinally of the apparatus, openings in the upper and lower walls of said housing for providing ventilation to remove heat dissipated in said subject carrier compartment, means in said subject carrier compartment below said projecting devices for containing the subject carrier, and means for guiding the subject carrier upwardly over a portion of said projecting devices and downwardly to the lower portion of said subject carrier compartment, whereby all of the subject carrier except the part to be projected and parts in immediate proximity thereto are arranged in the lower part of the housing where they are subjected to the cool air entering the lower wall of the housing.

20. In a projecting apparatus adapted to operate on subject carriers in strip form, the combination of mechanism for intermittently rotating a shaft, a sprocket mounted on said shaft and adapted to engage the subject carrier to advance the same, said shaft being provided with a shoulder which said sprocket is adapted to engage, the end of said shaft being threaded, and a clamping screw arranged on the threaded end of said shaft and adapted to press said sprocket against said shoulder for clamping the same on said shaft.

21. In a projection apparatus, the combination of a mechanism for intermittently displaying different pictures, electric means for actuating said mechanism, means operable by said mechanism for interrupting the supply of electric current to said electric means after a picture is displayed and immediately before the apparatus is about to display another picture, and means operable at will to again supply electric current momentarily to said electric means to cause said mechanism to display another picture.

22. In a projection apparatus, the combination of a mechanism operating in cycles to advance a subject carrier to successively display different pictures, each cycle of operation including a period during which the subject carrier is advanced to change the picture and a period during which said subject carrier remains stationary to permit the picture to be viewed, means operable by said mechanism for always and automatically stopping the operation of said mechanism in each cycle just as said mechanism is about to advance said subject carrier, and means operable at will while said stopping means remains unchanged for starting and maintaining momentarily the operation of said mechanism to begin another cycle.

HARVEY N. OTT.